(12) United States Patent
Danton et al.

(10) Patent No.: US 9,766,787 B2
(45) Date of Patent: Sep. 19, 2017

(54) USING VISUAL LANDMARKS TO ORGANIZE DIAGRAMS

(71) Applicant: Microsoft Technology Licensing, LLC, Redmond, WA (US)

(72) Inventors: Stephen M. Danton, Seattle, WA (US); Scott Roberts, Bothell, WA (US); Laurent Mollicone, Kirkland, WA (US); Jordan Sehn, Redmond, WA (US); Tad D. Price, Auburn, WA (US); David K. Peck, Seattle, WA (US); Yuri Rychikhin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 14/453,044

(22) Filed: Aug. 6, 2014

(65) Prior Publication Data

US 2014/0351727 A1    Nov. 27, 2014

Related U.S. Application Data

(63) Continuation of application No. 12/163,352, filed on Jun. 27, 2008, now Pat. No. 8,826,174.

(51) Int. Cl.
| | |
|---|---|
| *G06F 3/048* | (2013.01) |
| *G06F 3/0484* | (2013.01) |
| *G06F 3/0481* | (2013.01) |
| *G06T 11/20* | (2006.01) |
| *G06F 3/0482* | (2013.01) |
| *G06F 17/30* | (2006.01) |

(52) U.S. Cl.
CPC ........ *G06F 3/04842* (2013.01); *G06F 3/0481* (2013.01); *G06F 3/0482* (2013.01); *G06F 3/04845* (2013.01); *G06F 17/30241* (2013.01); *G06T 11/206* (2013.01)

(58) Field of Classification Search
None
See application file for complete search history.

(56) References Cited

U.S. PATENT DOCUMENTS 5,123,087 A  *  6/1992  Newell .............. G06F 3/04812
                                                    345/619
5,471,578 A     11/1995  Moran et al.
(Continued)

FOREIGN PATENT DOCUMENTS

| JP | 07-021241 | 1/1995 |
|---|---|---|
| JP | 08-096153 | 4/1996 |

(Continued)

OTHER PUBLICATIONS

"Third Office Action Received for Chinese Patent Application No. 200980124800.1", Mailed Date: Sep. 2, 2015, 6 Pages.
(Continued)

*Primary Examiner* — Hua Lu
(74) *Attorney, Agent, or Firm* — Workman Nydegger

(57) ABSTRACT

Visual landmarks are used to organize diagrams. Elements of a diagram can be arranged in accordance with configurable defined properties of visual landmarks to provide some degree of layout structure within the diagram. Users can customize visual landmarks to cause the visual landmarks to exhibit desired behavior.

20 Claims, 17 Drawing Sheets

(56) References Cited

U.S. PATENT DOCUMENTS

| | | | |
|---|---|---|---|
| 5,490,241 A * | 2/1996 | Mallgren | G06F 3/04842 345/419 |
| 5,555,357 A | 9/1996 | Fernandes et al. | |
| 5,565,888 A * | 10/1996 | Selker | G06F 3/04895 345/157 |
| 5,613,058 A * | 3/1997 | Koppolu | G06F 3/0481 707/999.001 |
| 5,644,737 A * | 7/1997 | Tuniman | G06F 3/0481 715/810 |
| 5,694,563 A * | 12/1997 | Belfiore | G06F 3/0481 715/811 |
| 5,809,267 A | 9/1998 | Moran et al. | |
| 5,844,558 A * | 12/1998 | Kumar | G06F 3/04845 345/440.2 |
| 5,861,886 A | 1/1999 | Moran et al. | |
| 5,886,694 A | 3/1999 | Breinberg et al. | |
| 5,892,554 A | 4/1999 | DiCicco et al. | |
| 6,034,684 A * | 3/2000 | Proehl | G06F 3/0481 715/764 |
| 6,065,021 A * | 5/2000 | George | G06F 17/211 700/192 |
| 6,425,121 B1 | 7/2002 | Phillips | |
| 6,426,761 B1 * | 7/2002 | Kanevsky | G06F 3/0481 715/764 |
| 6,437,804 B1 * | 8/2002 | Ibe | G06F 17/509 709/223 |
| 6,525,749 B1 | 2/2003 | Moran et al. | |
| 6,801,200 B1 | 10/2004 | Prakriya et al. | |
| 7,058,653 B2 * | 6/2006 | Okamoto | G06Q 10/06 |
| 7,071,952 B1 | 7/2006 | Ternulf et al. | |
| 7,096,454 B2 | 8/2006 | Damm et al. | |
| 7,233,341 B1 | 6/2007 | Sauervrei | |
| 7,253,823 B2 | 8/2007 | Wong et al. | |
| 7,318,199 B2 | 1/2008 | Nickolayev et al. | |
| 7,320,120 B2 | 1/2008 | Rajarajan et al. | |
| 7,356,774 B2 | 4/2008 | Shah et al. | |
| 7,483,028 B2 | 1/2009 | Wong et al. | |
| 7,600,197 B2 | 10/2009 | Gourdol et al. | |
| 7,657,840 B2 | 2/2010 | Gibson et al. | |
| 7,725,841 B2 | 5/2010 | Michelman et al. | |
| 8,209,630 B2 | 6/2012 | Thimbleby et al. | |
| 8,225,224 B1 * | 7/2012 | Robertson | G06F 3/0481 715/767 |
| 8,438,500 B2 | 5/2013 | Rapp et al. | |
| 9,043,722 B1 | 5/2015 | Holt | |
| 2002/0078433 A1 | 6/2002 | Rajarajan et al. | |
| 2002/0120784 A1 | 8/2002 | Rajarajan et al. | |
| 2003/0072486 A1 | 4/2003 | Loui et al. | |
| 2003/0214536 A1 * | 11/2003 | Jarrett | G06K 9/222 715/831 |
| 2004/0010776 A1 | 1/2004 | Shah | |
| 2005/0039145 A1 | 2/2005 | Diering et al. | |
| 2005/0044089 A1 | 2/2005 | Wu | |
| 2005/0050053 A1 | 3/2005 | Thompson | |
| 2005/0057575 A1 | 3/2005 | Nickolayev et al. | |
| 2005/0102634 A1 | 5/2005 | Sloo | |
| 2005/0195217 A1 * | 9/2005 | Robertson | G06F 3/0481 345/619 |
| 2005/0243373 A1 * | 11/2005 | Silverbrook | G06F 3/0317 358/1.18 |
| 2005/0257157 A1 | 11/2005 | Gilboa et al. | |
| 2006/0143570 A1 | 6/2006 | Washington et al. | |
| 2006/0150169 A1 * | 7/2006 | Cook | G06F 8/10 717/156 |
| 2006/0164682 A1 | 7/2006 | Lev | |
| 2006/0174568 A1 * | 8/2006 | Kinoshita | G06F 3/04845 52/395 |
| 2006/0212790 A1 | 9/2006 | Perantatos et al. | |
| 2006/0242557 A1 | 10/2006 | Nortis, III | |
| 2007/0101321 A1 | 5/2007 | Mahoney et al. | |
| 2007/0136351 A1 | 6/2007 | Dames et al. | |
| 2007/0157096 A1 | 7/2007 | Keren et al. | |
| 2007/0260332 A1 | 11/2007 | Torgerson | |
| 2007/0266307 A1 | 11/2007 | Panditharadhya et al. | |
| 2008/0012859 A1 * | 1/2008 | Saillet | G06T 11/60 345/440 |
| 2008/0022215 A1 | 1/2008 | Lee et al. | |
| 2008/0036784 A1 | 2/2008 | Behar et al. | |
| 2009/0132942 A1 * | 5/2009 | Santoro | G06F 3/0481 715/765 |
| 2009/0158200 A1 * | 6/2009 | Palahnuk | G06Q 30/00 715/781 |
| 2009/0228786 A1 | 9/2009 | Danton et al. | |
| 2009/0319939 A1 * | 12/2009 | Danton | G06F 3/0481 715/779 |
| 2009/0327954 A1 | 12/2009 | Danton et al. | |
| 2010/0188410 A1 | 7/2010 | Gilbert et al. | |
| 2011/0161827 A1 * | 6/2011 | Dedis | G06F 3/0481 715/738 |
| 2012/0044172 A1 | 2/2012 | Ohki | |
| 2013/0019175 A1 | 1/2013 | Kotler et al. | |
| 2013/0086498 A1 | 4/2013 | Eskander | |
| 2013/0187866 A1 | 7/2013 | Kim et al. | |
| 2013/0246955 A1 | 9/2013 | Schwesig et al. | |
| 2015/0286343 A1 | 10/2015 | Welicki et al. | |

FOREIGN PATENT DOCUMENTS

| | | |
|---|---|---|
| JP | 08-221500 | 8/1996 |
| JP | 2002-208021 | 7/2002 |
| JP | 2011526039 | 9/2011 |
| KR | 20080044827 A | 5/2008 |
| WO | 2007098243 | 8/2007 |
| WO | WO 2009158219 | 12/2009 |
| WO | 2013157013 | 10/2013 |

OTHER PUBLICATIONS

"Office Action Issued in Korean Application No. 10-2010-7029202", Mailed Date: Jan. 14, 2016, 10 Pages.

"Office Action Issued in Canada Application No. 2,724,684", Mailed Date: Feb. 17, 2016, 4 Pages.

"Office Action Issued in Canadian Patent Application No. 2,724,684", Mailed Date: Jun. 23, 2016, 5 Pages.

Notice of Allowance Issued in Japanese Patent Application No. 2011-516434, Mailed Date: Apr. 28, 2015, 3 Pages.

"Supplementary Search Report Issued in European Patent Application No. 09770753.3", Mailed Date: Aug. 4, 2016, 7 Pages.

International Preliminary Report on Patentability Issued in PCT Application No. PCT/US2015/023448, mailed Jul. 4, 2016, 8 pages.

Second Written Opinion Issued in PCT/US2015/023448, mailed Mar. 15, 2016, 7 pages.

International Search Report and Written Opinion Issued in PCT/US2015/023448, mailed Jun. 9, 2015, 11 pages.

"UI Element Guidelines: Menus" Sep. 26, 2011.

"Microsoft Word 2007, released Nov. 30, 2006, screenshot printout" pp. 1-5.

"BET: PowerPoint-Diagrams-Radial Diagrams" Date: Oct. 17, 2006, pp. 1-2.

"Microsoft Office Visio 2007 Step by Step" by Judy Lemke, Feb. 14, 2007.

Venkatrao, "SqL/CLI a New Binding Style for SQL" SIGMOD Record, vol. 24, No. 4, Dec. 1995, pp. 72-77.

Moustakas et al. "Master-Piece: A Multimodal (Gesture + Speech) Interface for 3D Model Search and Retrieval Integrated in a Virtual Assembly Application" eNTERFACE 2005 the Summer Workshop on Multimodal Interfaces, Jul. 18-Aug. 12, pp. 62-75.

Zhao et al. "Incremental Recognition in Gesture-based and Syntax-Directed Diagram Editors" Interchi '93, 1998 ACM, pp. 95-100.

Laviola Jr. et al. "MathPad2: A System for the Creation and Exploration of Mathematical Sketches" 2004 ACM, pp. 432-440.

Henry et al. "Integrating Gesture and Snapping into a User Interface Toolkit" 1990 ACM, pp. 112-122.

U.S. Appl. No. 12/045,517, Apr. 14, 2011, Office Action.

U.S. Appl. No. 12/045,517, Dec. 6, 2012, Office Action.

U.S. Appl. No. 12/045,517, May 30, 2013, Office Action.

U.S. Appl. No. 12/045,517, Sep. 20, 2013, Office Action.

(56) References Cited

OTHER PUBLICATIONS

U.S. Appl. No. 12/045,517, Feb. 26, 2014, Office Action.
U.S. Appl. No. 14/310,617, Sep. 13, 2016, Office Action.
Jiang, Yi-Feng, "Shape Alignment by Learning a Landmark-PDM Coupled Model", Proceedings of the 18th International Conference on Pattern Recognition (ICPR '06), Aug. 2006 IEEE, 4 pages.
MSDN, "Using Alignment Boxes to Snap Shapes to a Grid", 2008 Microsoft Corporation, 3 pages.
MSDN, "Working with Shape Layers", 2008 Microsoft Corporation, 5 pages.
Sonoe Takagami, "Adobe Illustrator CS3 Essential Book", 1st Ed., pp. 32-34, Mainichi Communications Inc., Aug. 15, 2007.
U.S. Appl. No. 12/163,352, Jul. 26, 2011, Office Action.
U.S. Appl. No. 12/163,352, Feb. 2, 2012, Office Action.
U.S. Appl. No. 12/163,352, Sep. 13, 2013, Office Action.
U.S. Appl. No. 12/163,352, Apr. 24, 2014, Notice of Allowance.
"Office Action Issued in Canadian Patent Application No. 2,724,684", Mailed Date: Feb. 6, 2017, 5 Pages.
"How to Use the New Youtube," Dec. 3, 2012, https://www.youtube.com/watch?v=r0272TInjR4, 1 page.
Office Action dated Jun. 16, 2017 cited in U.S. Appl. No. 14/310,617 (Copy Attached).

\* cited by examiner

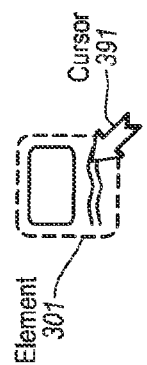
FIG. 3A
(On Display 109)
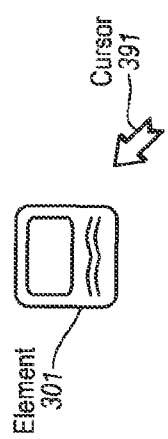
FIG. 3B
(On Display 109)
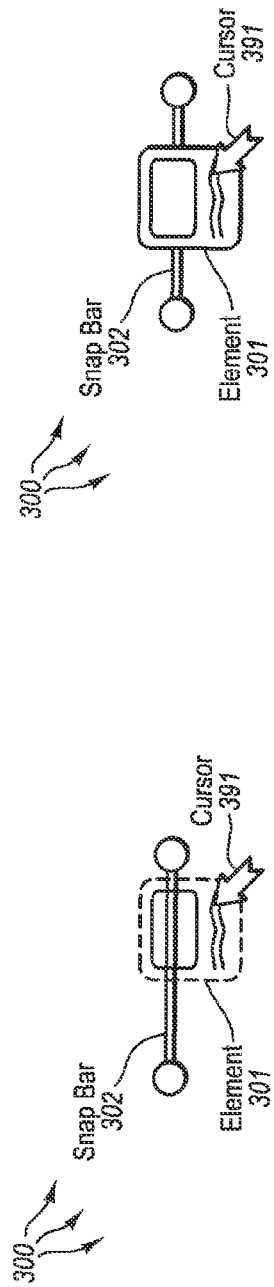
FIG. 3C
(On Display 109)
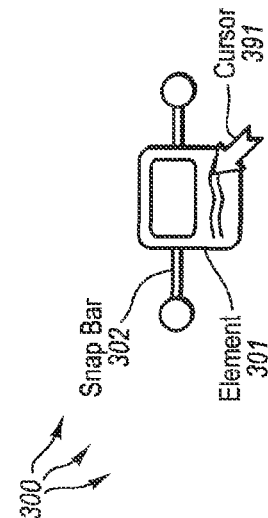
FIG. 3D
(On Display 109)

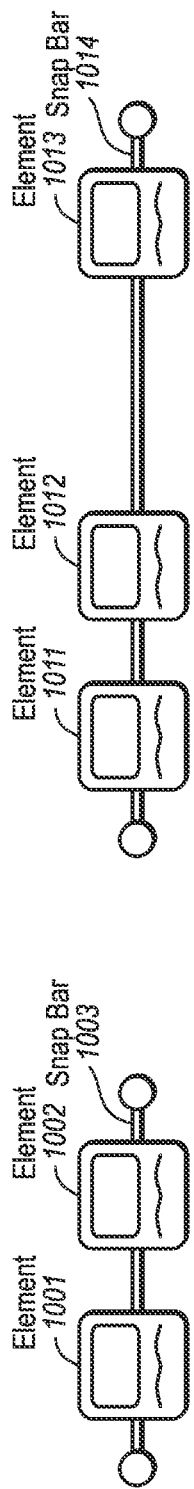
FIG. 10B
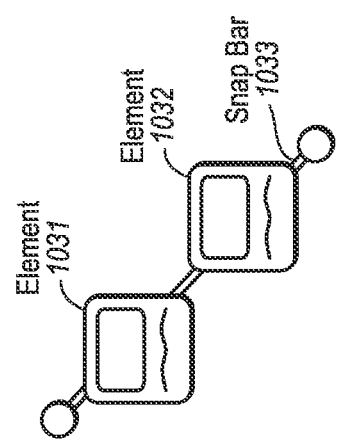
FIG. 10D
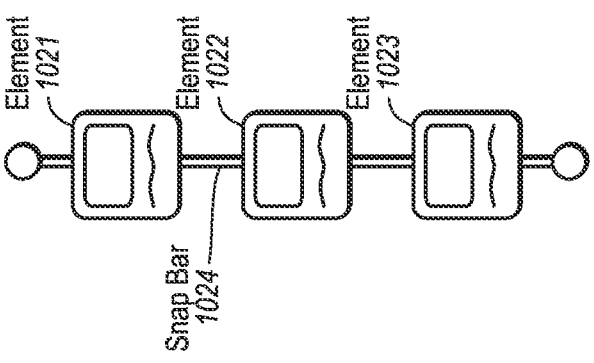
FIG. 10C
FIG. 10A

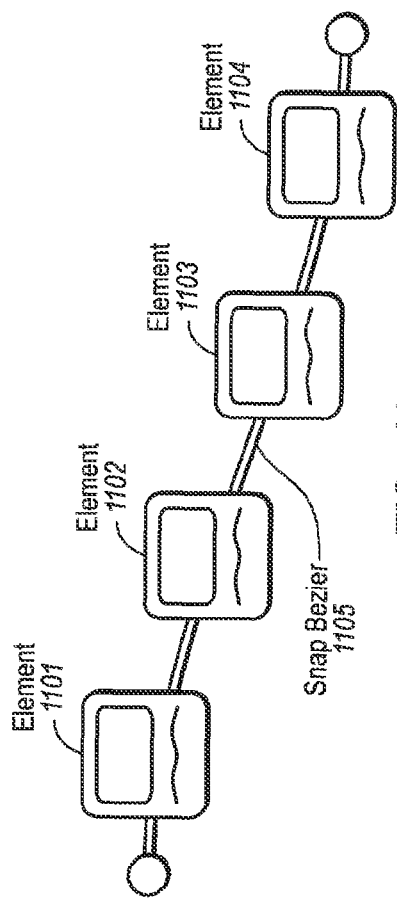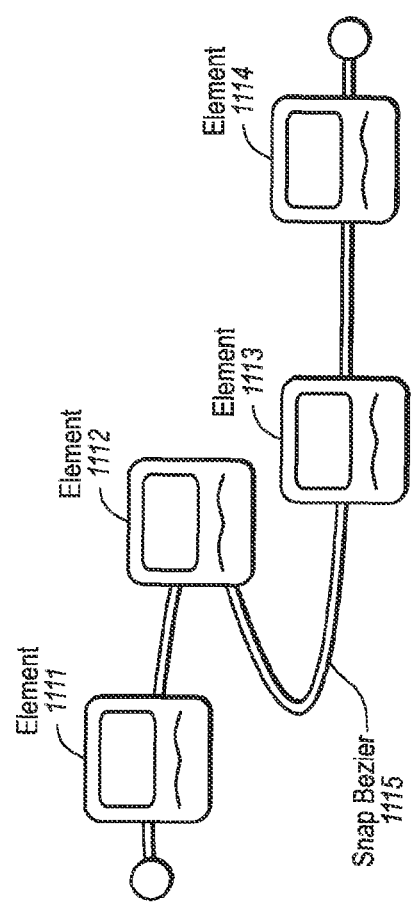

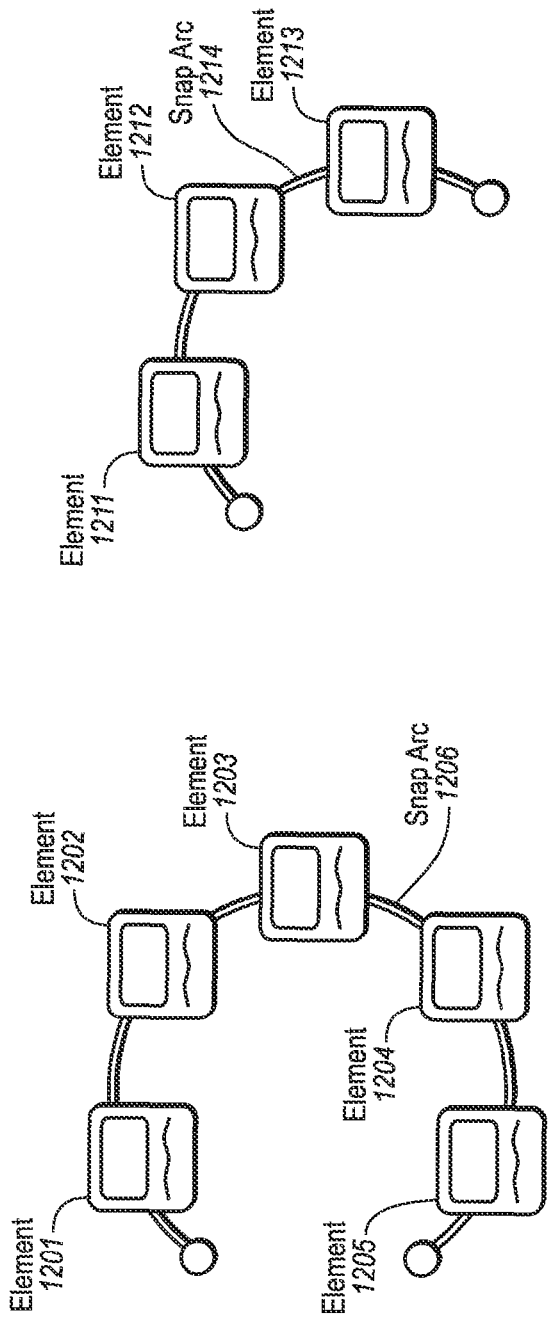
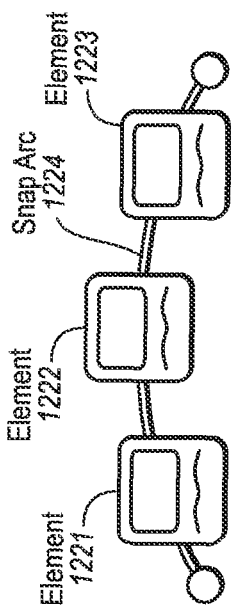
FIG. 12A
FIG. 12B
FIG. 12C

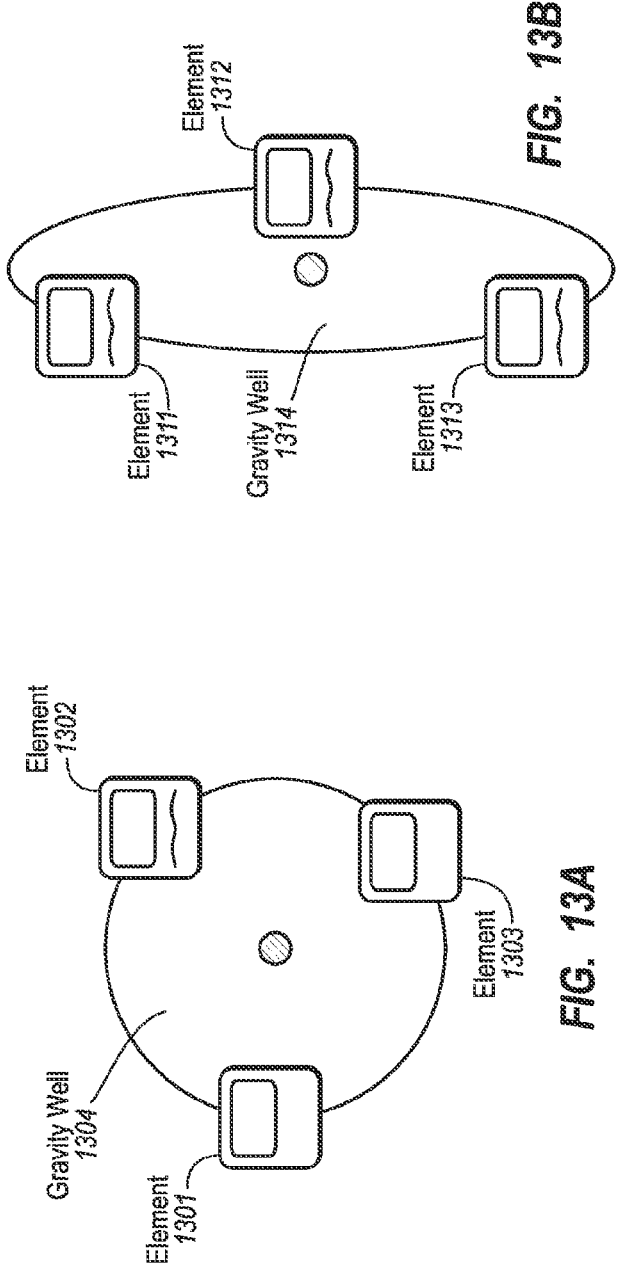
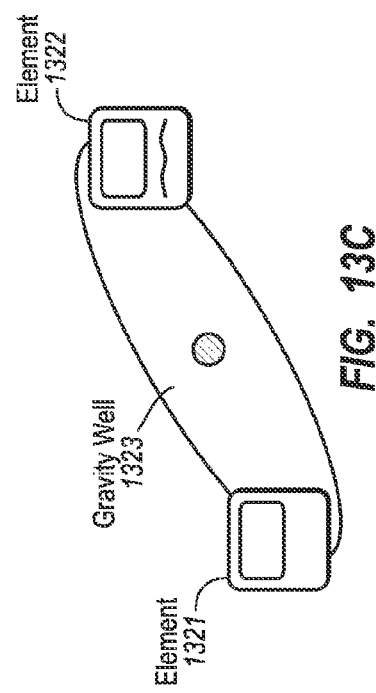
FIG. 13A
FIG. 13B
FIG. 13C

USING VISUAL LANDMARKS TO ORGANIZE DIAGRAMS

CROSS-REFERENCE TO RELATED APPLICATIONS

This application is a continuation of U.S. patent application Ser. No. 12/163,352 filed on Jun. 27, 2008, entitled "USING VISUAL LANDMARKS TO ORGANIZE DIAGRAMS," which issued as U.S. Pat. No. 8,826,174 on Sep. 2, 2014, and which application is expressly incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many business related processes are distributed across a number of different computer systems and/or a number of different computing components.

For example, diagramming applications can be used to generate flow charts, organization charts, workflow diagrams, etc. Most diagramming applications include at least a toolbar and a canvas area. A user can pull shapes (e.g., circles, rectangles, squares, diamonds, etc.) from the tool bar to add to the canvas. Shapes can be connected to one another to indicate relationships between the shapes. Users can also rearrange and remove existing shapes and connections within the canvas.

At least some diagramming applications utilize a free form canvas allowing the user complete control over the organization and spacing of shapes on a canvas. Users are free to (re)arrange shapes and connections as they see fit with no restrictions. Thus, free form canvases give a user significant flexibility to create diagrams to their exact specifications.

However, creating diagrams using a free from canvas can also be tedious and labor intensive. The meaning of a diagram is more appropriately conveyed (e.g., visually perceived) when shapes within a diagram are organized and appropriately spaced. Thus, each time a diagram changes (e.g., a new shape is introduced into or an existing shaped is removed from or moved within a diagram), the organization and spacing of shapes and connections may need to be adjusted to appropriately convey the new meaning of the diagram.

Unfortunately, using a free form canvas, a user is required to individually make all these adjustments, such as, for example, disconnecting and reconnecting shapes, pixel alignment, etc., on their own. For many diagrams, and especially larger and/or more complex diagrams, these adjustments can be numerous and can take a considerable amount of time to implement. Further, a single change to a diagram can have a ripple effect causing a large number of shapes to become unorganized and or inappropriately spaced.

Accordingly, some diagramming applications include automated mechanisms, such as, for example, an auto-layout algorithm, to assist users in appropriately adjusting shapes and connections in response changes to a diagram. An auto-layout algorithm can have various layout (e.g., organizational and spacing) constraints that essentially dictate the placement of shapes and connections within a diagram. An auto-layout algorithm can also include one or more of a variety of different functions.

For example, when a shape (either new or moved) is inserted into a specified location within a diagram, an auto-layout algorithm can automatically move the shape from the specified location to a more appropriate (e.g., close by) location (on a canvas) to comply with layout constraints. Similarly, when a shape is removed (either deleted or moved) from a location within a diagram, the auto-layout algorithm can automatically adjust shapes previously connected to the removed shape (on the canvas) to comply with layout constraints. When a shape is moved within a diagram, both of these functionalities can be implemented. Auto-layout algorithms can also include the functionality to adjust any and other shapes and connections within a diagram in response to adding, deleting, or moving a shape to comply with layout constraints (e.g., to compensate for ripple effects).

Accordingly, auto-layout algorithms can be utilized to automatically arrange shapes and connections within a diagram to better convey the new meaning of the diagram. Some auto-layout algorithms even permit the tuning of layout constraints so that a user has some control of the layout of a diagram. However, auto-layout algorithms are typically prescriptive and do not permit non-compliant changes (even based on tuned layout constraints) to a diagram. Further, a user typical has no way to know before inserting, moving, or deleting a shape, how the auto-layout algorithm will adjust the location of the shape and/or surrounding connected shapes.

Often, a shape can be placed at any number of locations relative to existing shapes of a diagram and comply with layout constraints. However, the user may have no way to know before making a change what the compliant locations are relative to the existing shape. Thus, a user must rely on the auto-layout algorithm to select a compliant location, which based on the user's intent for a diagram, may not be the most appropriate compliant location.

Some further tools do exist to provide limited organization to otherwise free form diagrams. These further tools can provide abilities such as align, center, and distribute. However, these further tools have a number of deficiencies. For example, the tools are typically not presented on the canvas. Further, the tools do not automatically reapply on updates, such as, for example, adding a new shape. As such, the tools must be reapplied (with some degree of frequency and in some environments essentially constantly) to invoke their functionality. Additionally, these further tools are typically not customizable. Lack of customizability makes it difficult to construct and maintain specialized layouts.

BRIEF SUMMARY

The present invention extends to methods, systems, and computer program products for using visual landmarks to organize diagrams. In some embodiments, visual landmarks are used to organize a diagram. A computer system presents one or more visual elements representing a diagram. The computer system presents a visual landmark along with the one or more visual elements within the diagram. The visual landmark is configured with one or more properties that are to be applied to associated visual elements to position the associated visual elements relative to the visual landmark.

The computer system receives input selecting one of the one or more visual elements for placement in the diagram. The computer system receives further input indicating that the selected visual element is to be associated with the visual landmark. The computer system automatically positions the selected visual element relative to the visual landmark in accordance with the one or more corresponding properties of the visual landmark to organize the selected visual element within the diagram. The selected visual element is positioned in response to receiving the further input.

In other embodiments, a visual landmark is customized for use in organizing a diagram. A computer system accesses and visually presents a stored visual landmark that can be used to organize visual elements in a diagram. The computer system alters the visual presentation of the visual landmark in accordance with user-entered input.

The computer system configures one or more properties of the visual landmark in accordance with user-entered input. The configured one or more properties indicate how to automatically position an associated visual element relative to the visual landmark to organize the associated visual element within a diagram. The computer system stores the altered visual presentation along with the configured one or more properties as a new visual landmark. The new visual landmark is for use in organization diagrams in accordance with the user-entered input.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3D illustrate an example of using visual landmarks to organize a diagram.

FIGS. 10A-10D illustrate examples of snap bars that can be used to organize elements in a diagram.

FIGS. 11A and 11B illustrate examples of snap beziers that can be used to organize elements in a diagram.

FIGS. 12A-12C illustrate examples of snap arcs that can be used to organize elements in a diagram.

FIGS. 13A-13C illustrate examples of gravity wells that can be used to organize elements in a diagram.

DETAILED DESCRIPTION

Figure 1:
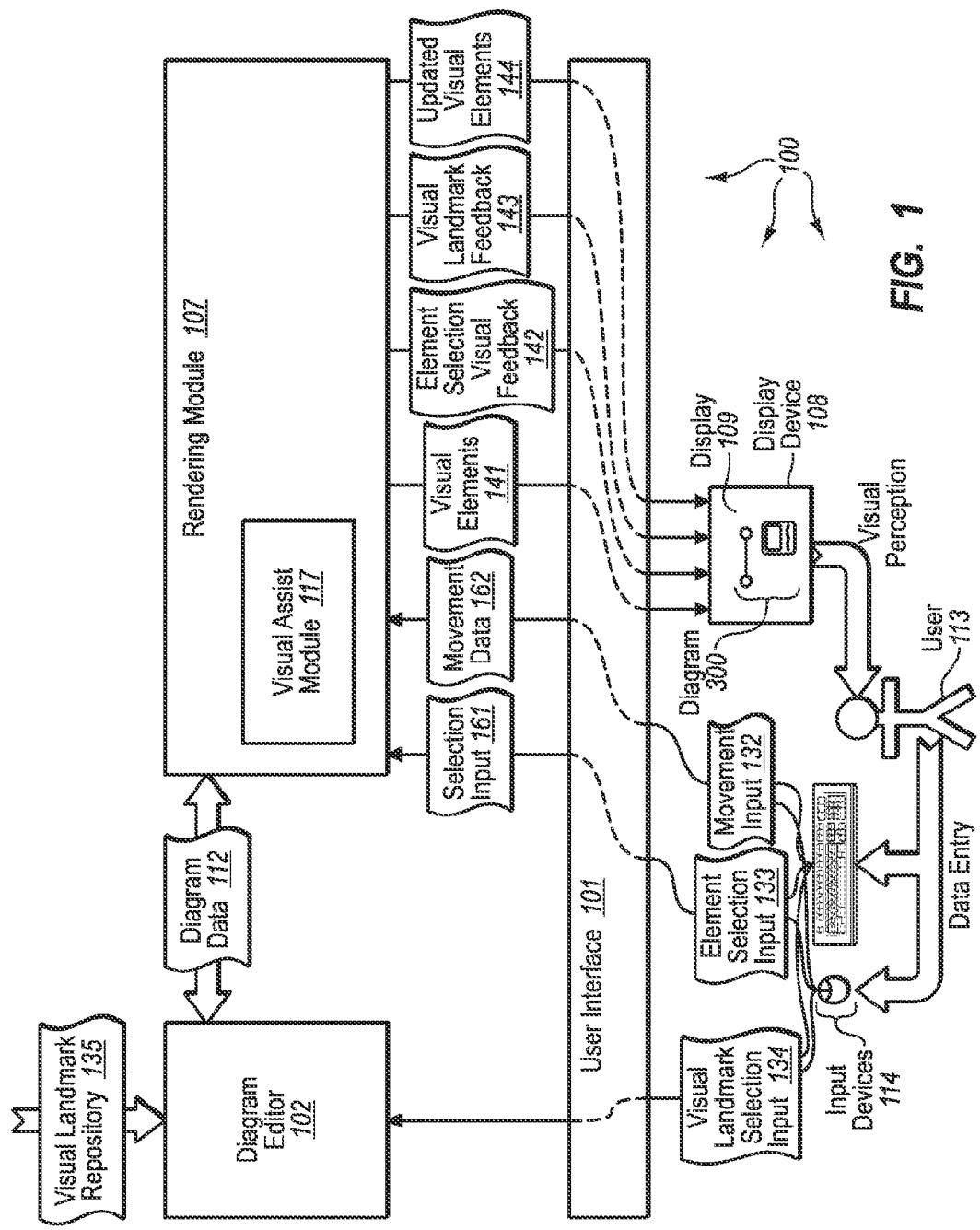
FIG. 1 illustrates an example computer architecture that facilitates using visual landmarks to organize diagrams.

The present invention extends to methods, systems, and computer program products for using visual landmarks to organize diagrams. In some embodiments, visual landmarks are used to organize a diagram. A computer system presents one or more visual elements representing a diagram. The computer system presents a visual landmark along with the one or more visual elements within the diagram. The visual landmark is configured with one or more properties that are to be applied to associated visual elements to position the associated visual elements relative to the visual landmark.

The computer system receives input selecting one of the one or more visual elements for placement in the diagram. The computer system receives further input indicating that the selected visual element is to be associated with the visual landmark. The computer system automatically positions the selected visual element relative to the visual landmark in accordance with the one or more corresponding properties of the visual landmark to organize the selected visual element within the diagram. The selected visual element is positioned in response to receiving the further input.

In other embodiments, a visual landmark is customized for use in organizing a diagram. A computer system accesses and visually presents a stored visual landmark that can be used to organize visual elements in a diagram. The computer system alters the visual presentation of the visual landmark in accordance with user-entered input.

The computer system configures one or more properties of the visual landmark in accordance with user-entered input. The configured one or more properties indicate how to automatically position an associated visual element relative to the visual landmark to organize the associated visual element within a diagram. The computer system stores the altered visual presentation along with the configured one or more properties as a new visual landmark. The new visual landmark is for use in organization diagrams in accordance with the user-entered input.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates flexible creation of auto-layout compliant diagrams. Referring to FIG. 1, computer architecture 100 includes user-interface 101, diagram editor 102, and rendering module 107. Each of the depicted components can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Input devices 114 can include a variety of input devices, such as, for example, a keyboard and/or mouse. User 113 can utilize input devices 114 to enter data into computer architecture 100. Display device 108 can visually present data output from computer architecture 100 on display 109. User 113 can visually perceive data displayed at display 109.

Generally, user-interface 101 is configured to function as an intermediary software layer between user 113 and the other components of computer architecture 100. User-interface 101 can be configured with appropriate software, such as, for example, drivers, to receive input from input devices 114 and to send output to display device 108. Thus, user-interface 101 can forward user-input to other components, such as, for example, diagram editor 102. User-interface 101 can also forward renderable image data from other components, such as, for example, rendering module 107, to display device 108.

Diagram editor 102 is configured to edit diagram data for renderable diagrams. Diagram data can indicate shape types, shape locations, and connections between shapes for visual elements in a diagram. In response to user-input, diagram editor 102 can add, delete, and alter diagram data representing shape locations, shape types, and connections for visual elements of a diagram. In some embodiments, a user action causes diagram editor 102 to perform a series of edits to diagram data. For example, in response to placement of a visual element in a diagram, diagram editor 102 can a) edit diagram data to include the location and type of a shape for the visual element and b) edit diagram data to include connections between the shape and other appropriate shapes.

Diagram editor 102 can also access visual landmarks from visual landmark repository 135 and include data representing visual landmarks in diagram data. Thus, similarly to shapes within a diagram, diagram editor 102 can also add, delete, and alter diagram data representing visual landmark locations, types, and connections for visual landmarks within a diagram. Visual landmark operations can also be in response to user-input.

Rendering module 107 is configured to generate interconnected visual elements (shapes and/or visual landmarks) from diagram data for rendering a diagram at display device 108. Diagrams can be any of a variety of different types of diagrams includes flow charts, workflow diagrams, organizational charts, process diagrams, schematics, etc. Diagrams can include any of a variety of different visual elements including geometric shapes, such as, for example, circles, diamonds, squares, rectangles, triangles, etc. Connections between visual elements can be represented as a line.

As depicted, rendering module 107 includes visual assist module 117. Visual assist module 117 is configured to provide visual feedback to a user to assist the user with diagram creation and editing. For example, upon user selection of a visual element in a diagram, visual assist module 117 can provide visual feedback indicating selection of the visual element. Visual feedback can include altering visual characteristics of elements and connections to indicate selection (e.g., graying out the outline of the visual element). Visual feedback can also include supplementing a diagram with additional visual information to assist a user in the layout of elements and connections with in a diagram.

FIGS. 3A-3D illustrate using visual landmarks to organize diagrams 300.

Figure 2:
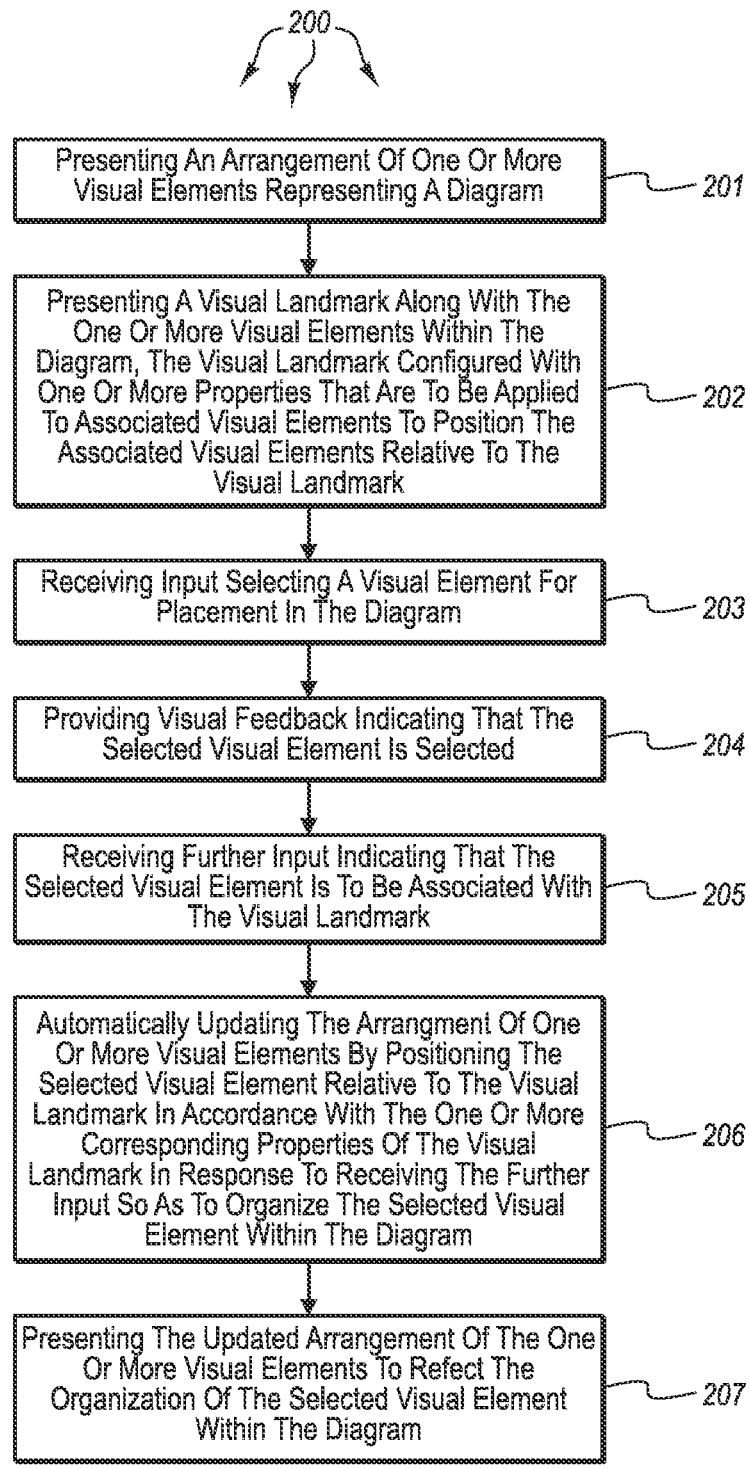
FIG. 2 illustrates a flow chart of an example method for using visual landmarks to organize a diagram.

FIG. 2 illustrates a flow chart of a method 200 for using visual landmarks to organize a diagram. Method 200 will be described with respect to the components and data depicted in computer architecture 100 and with respect to diagram 300.

Method 200 includes an act of presenting an arrangement of one or more visual elements representing a diagram (act 201). Method 200 includes an act of presenting a visual landmark along with the one or more visual elements within the diagram, the visual landmark configured with one or more properties that are to be applied to associated visual elements to position the associated visual elements relative to the visual landmark (act 202). For example, user-interface 101 can present visual elements 141 at display device 108. Visual elements 141 can include elements and one or more visual landmarks. For example, referring to FIG. 3A, element 301 and snap bar 302 can be presented on display 109. Snap bar 302 can be configured with one or more properties that to be applied to element 301 to position element 301 relative to snap bar 302. For example, snap bar 302 can include a property to vertical align element 301 on snap bar 302.

Method 200 includes an act of receiving input selecting a visual element for placement in the diagram (act 203). For example, user-interface 101 can receive user-element selection input 133 (e.g., a mouse click on element 301). User-interface 101 can determine that user-element selection input 133 is the selection of a new or existing visual element. As such, user-interface 101 can forward selection input 161 to rendering module 107.

A new element (e.g., from a toolbar) can be selected for inclusion in a diagram. An existing element (e.g., already in the diagram) can be selected for moving within the diagram. For example, referring to FIG. 3A, element 301 (a new element or an element from elsewhere in diagram 300) can be selected for inclusion into or movement within diagram 300. When an existing element is selected for movement, a current representation of the existing element can remain in its current location. Along with the current representation, a selected temporary representation of the existing element can be created. The selected temporary representation of the element can be moved within a diagram to represent possible movement of the element to different locations in the diagram. If actual movement of the existing element eventually results, the current representation of the element is moved to the new location.

Method 200 includes an act of providing visual feedback indicating that the selected visual element is selected (act 204). For example, visual assist module 117 can provide element selection visual feedback 142 for display at display device 108. Element selection visual feedback can result from altering the visual characteristics of a selected visual element in some way to indicate that it is selected. For example, referring now to FIG. 3B, user 113 has selected element 301 with cursor 391. As depicted, element 301 is represented with a dashed line (as opposed to a solid line) to indicate that element 301 is selected. However, other visual characteristic changes, such as, for example, changes to color, brightness, size, shape, etc. are also possible. Visual perception of the dashed line (or other visual characteristic) permits user 113 to more easily determine that element 301 is selected. If element 301 is an existing element, a current representation of element 305 can remain elsewhere (not shown) in diagram 300.

Method 200 includes an act of receiving further input indicating that the selected visual element is to be associated with the visual landmark (act 205). For example, referring to both FIGS. 1 and 3C, user-interface 101 can detect movement input 132 indicating that element 301 has moved so that it is at least partially co-located with snap bar 302 (e.g., on display 109). User-interface 101 can determine that movement input 132 is relevant to rendering module 107 and can forward movement data 162 to rendering module 107. Rendering module 107 can determine from movement data 162 that element 301 is at least partially co-located snap bar 302.

Method 200 includes an act of automatically updating the arrangement of one or more visual elements by positioning the selected visual element relative to the visual landmark in accordance with the one or more corresponding properties of the visual landmark in response to receiving the further input so as to organize the selected visual element within the diagram (act 206). For example, in response to movement data 162 (e.g., co-location of element 301 with snap bar 302), diagram editor 102 can update diagram data 112 (e.g., representing diagram 300) by positioning element 301 relative to snap bar 302 in accordance with the one or more properties of snap bar 302. Positioning element 301 relative to snap bar 302 can be performed to organize element 301 within diagram 300.

Method 200 includes an act of presenting the updated arrangement of the one or more visual elements to reflect of organization of the selected visual element within the diagram (act 207). For example, referring to FIGS. 1 and 3D, rendering module 107 can send updated visual elements 143 (e.g., element 301 and snap bar 302 as arranged in FIG. 3D) to display device 109. Display device 109 can present updated visual elements 143. For example, as depicted in FIG. 3D, element 301 is aligned vertically on snap bar 302.

Accordingly, FIGS. 3A-3D illustrate an example of flexibly organizing an element within a diagram using a snap bar. However, various other embodiments are also contemplated. Any of the previously and subsequently described diagrams can be displayed at and interacted with through the display (e.g., display 109) of a display device (e.g., display device 108).

Embodiments of the invention facilitate tagging elements for positioning relative to a visual landmark. For example, FIGS. 4A-4E illustrate example of tagging a plurality of elements to apply the properties of a snap bar to the plurality of elements in diagram 400.

Figure 4A:
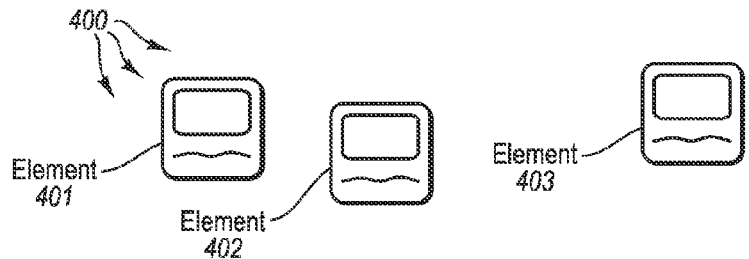
FIGS. 4A-4E illustrate another example of using visual landmarks to organize a diagram.
Figure 4B:
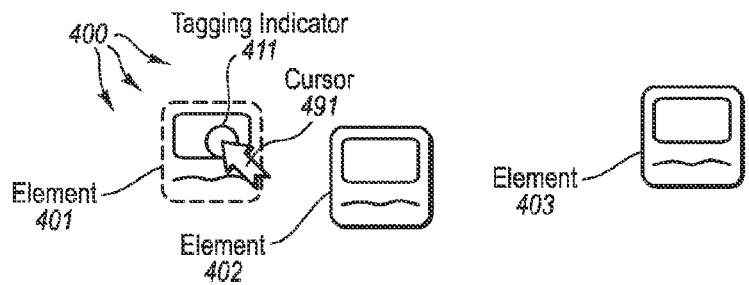
Figure 4C:
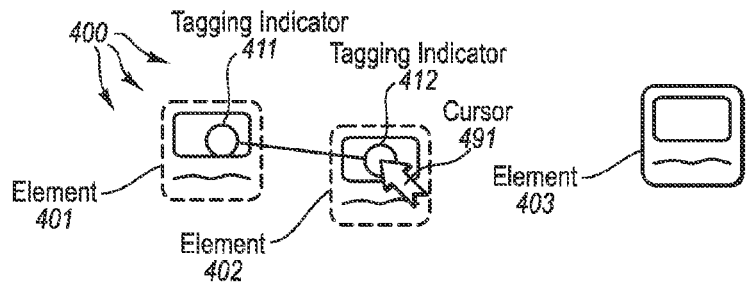
Figure 4D:
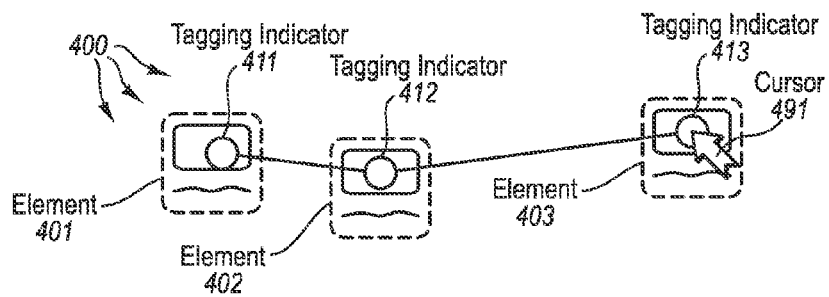

As depicted in FIG. 4A, diagram 400 includes elements 401, 402, and 403. Elements 401, 402, and 403 are in arbitrary positions within diagram 400. As depicted in FIG. 4B, cursor 491 is used to apply tagging indicator 411 to element 401. As depicted in FIG. 4C, cursor 491 is used to apply tagging indicator 412 to element 402. Element 401 remains tagged with tagging indicator 411. As depicted in FIG. 4D, cursor 491 is used to apply tagging indicator 413 to element 403. Elements 401 and 402 remain tagged with tagging indicators 411 and 412 respectively. Tagging of elements can be represented in selection input 161. Changing elements to dashed lines in response to tagging can be represented in element selection visual feedback 142.

Subsequent to tagging element 403, user 113 can submit further input, such as, for example, selecting an item from a menu or button bar (presented by user-interface 101), to indicate that elements 401, 402, and 403 are to be associated with a snap bar (or some other visual landmark). This further input can be received at user-interface 101 and forwarded to rendering module 107 and/or diagram editor 102. Rendering module 107 and diagram editor 102 can interoperate to automatically update the arrangement of diagram 400. For example, rendering module 107 represented changed positions for elements 401, 402, and 403 and diagram editor 102 can alter diagram data 112 to include snap bar 404. Elements 401, 402, and 403 can be positioned relative to snap bar 404 in accordance with the properties snap bar 404 (e.g., even spacing between elements and vertical alignment).

Figure 4E:
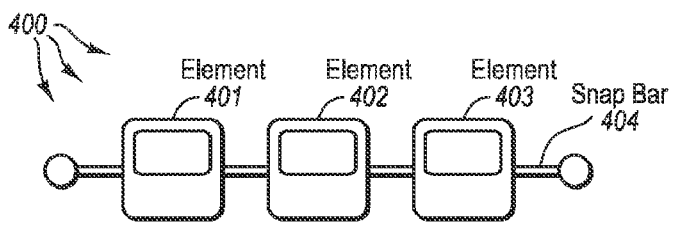

Rendering module 107 can present the updated arrangement of diagram 400 (represented in updated visual elements 144) at display device 109. As depicted in FIG. 4E, elements 401, 402, and 403 are evenly spaced on snap bar 404 and are vertically aligned on snap bar 404.

Figure 5A:
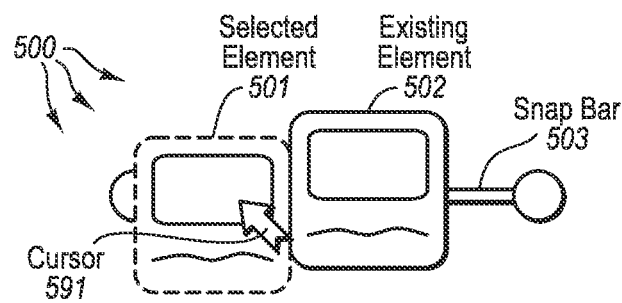
FIGS. 5A-5C illustrate another example of using visual landmarks to organize a diagram.
Figure 5B:
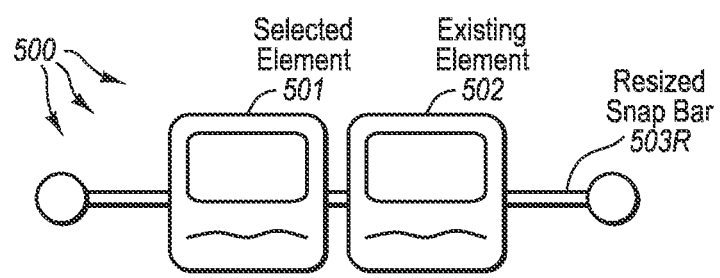
Figure 5C:
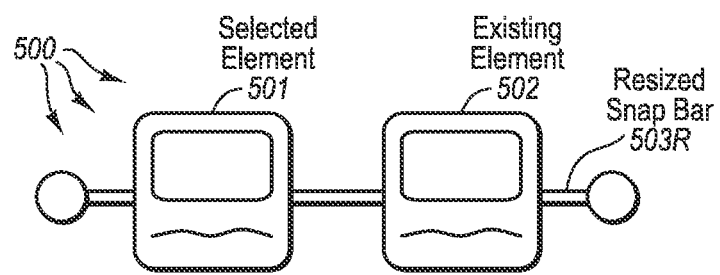

Embodiments of the invention facilitate adding elements to a visual landmark that already includes one or more elements. FIGS. 5A-5C illustrate an example of adding an element to a snap bar in a diagram 500.

As depicted in FIG. 5A, selected element 501 (either a new element or existing element from elsewhere in diagram 500) is selected with cursor 591 and moved to be partially co-located with snap bar 503. For example, through user input, user 113 can drag selected element 501 onto snap bar 503. Existing element 502 is already positioned on snap bar 503 in accordance with the properties of snap bar 503.

Through further user input, user 113 can indicate that selected element 501 is to be positioned on snap bar 503. For example, user 113 can drop selected element 501 onto snap bar 503. In response to detecting that selected element 501 is dropped onto snap bar 503, diagram 500 can be automatically updated and presented on display 109. For example, as depicted in FIG. 5B, snap bar 503 is resized to resized snap bar 503R to accommodate selected element 501. As depicted in FIG. 5C, selected element 501 and existing element 502 are adjusted and aligned on resized snap bar 503R in accordance with the properties of resized snap bar 503R.

Figure 6A:
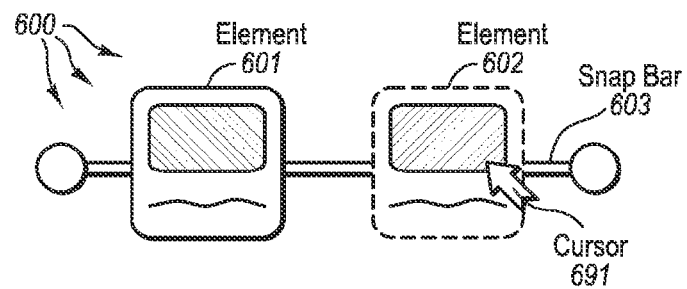
FIGS. 6A and 6B illustrate another example of using visual landmarks to organize a diagram.
Figure 6B:
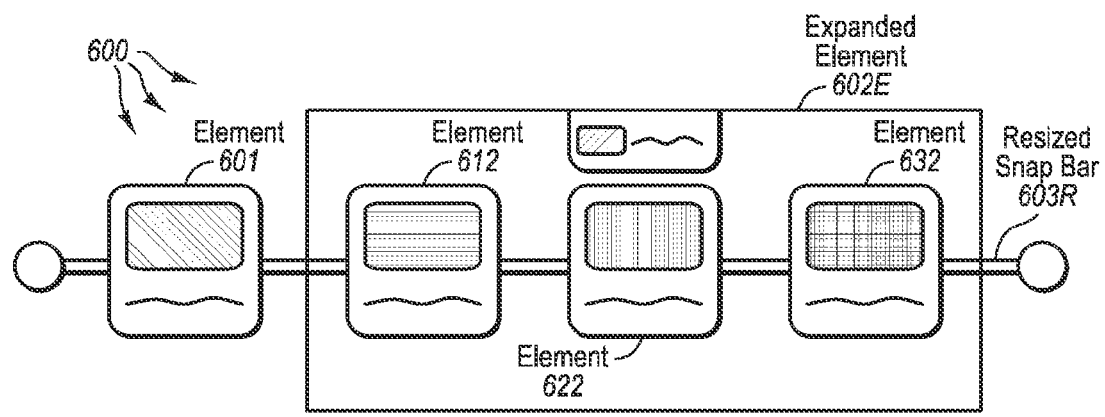

Embodiments of the invention facilitate expanding existing elements on a visual landmark. FIGS. 6A and 6B illustrate an example of expanding an element on a snap bar in a diagram 600.

As depicted in FIG. 6A, elements 601 and 602 are positioned relative to snap bar 603 in accordance with the properties of snap bar 603. Element 602 is selected (e.g., through user input) with cursor 691. Through further user input, user 113 can indicate that element 602 is to be expanded on snap bar 603. For example, user 113 can select an expansion item from a menu or button bar (presented by user-interface 101).

In response to the further user input selecting an expansion item, diagram 600 can be automatically updated and presented on display 109. For example, as depicted in FIG. 6B, snap bar 603 is resized to resized snap bar 603R to accommodate expanded element 602E. Expanded element 602E also reveals three sub-elements, elements 612, 622, and 632. Element 601, expanded element 602E, and elements 612, 622, and 632 are adjusted and aligned on resized snap bar 603R in accordance with the properties of resized snap bar 603R

Figure 7A:
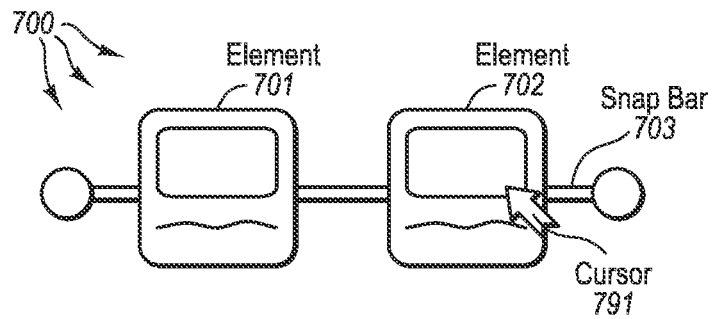
FIGS. 7A-7C illustrate another example of using visual landmarks to organize a diagram.
Figure 7B:
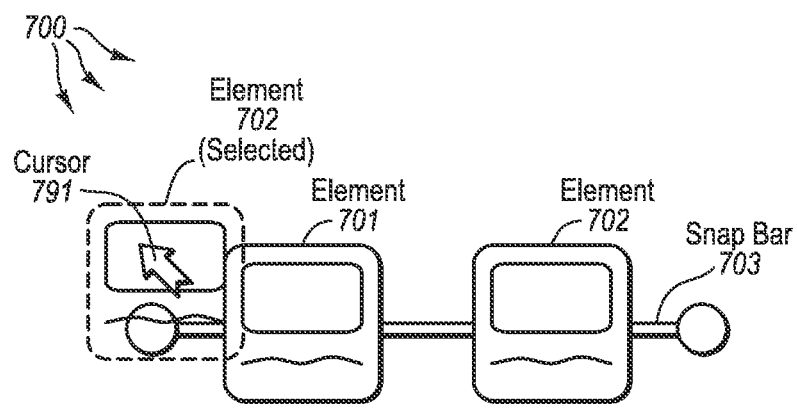
Figure 7C:
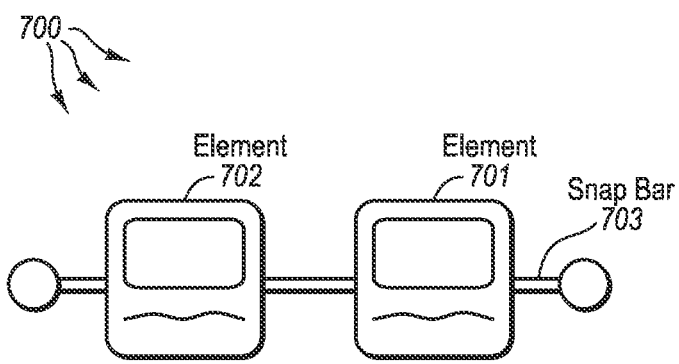

Embodiments of the invention facilitate moving an element on a visual landmark to a different position on the visual landmark. FIGS. 7A-7C illustrate an example of moving an element on a snap bar in a diagram 700.

As depicted in FIG. 7A, elements 701 and 702 are positioned on snap bar 703 in accordance with the properties of snap bar 703. Subsequently received user-input indicates that element 702 is to be moved from the right side of element 701 to the left side of element 701. For example, element 702 can be selected with cursor 791 and dragged from the right side of element 701 to the left side of element 701. As depicted in FIG. 7B, element 702 (selected) is positioned to the left of element 701.

Through further user input, user 113 can indicate that element 702 is to be positioned to the left of element 702 on snap bar 703. For example, user 113 can drop element 702 (selected) at the position indicated in FIG. 7B. In response to detecting that element 702 (selected) is dropped onto snap bar 703, diagram 700 can be automatically updated and presented on display 109. For example, as depicted in FIG. 7C, elements 701 and 702 are adjusted and aligned on snap bar 703 in accordance with the properties of snap bar 703. Element 702 is positioned to the left of element 701.

Figure 8A:
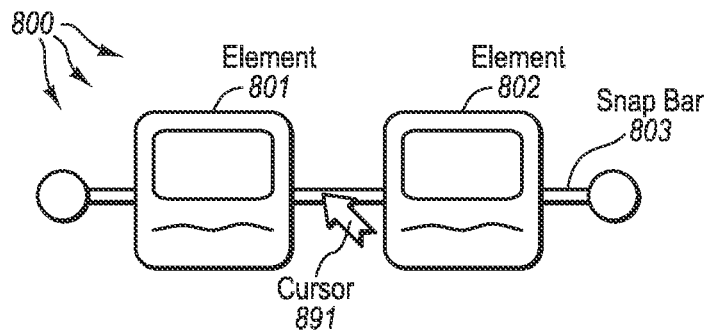
FIGS. 8A-8C illustrate another example of using visual landmarks to organize a diagram.
Figure 8B:
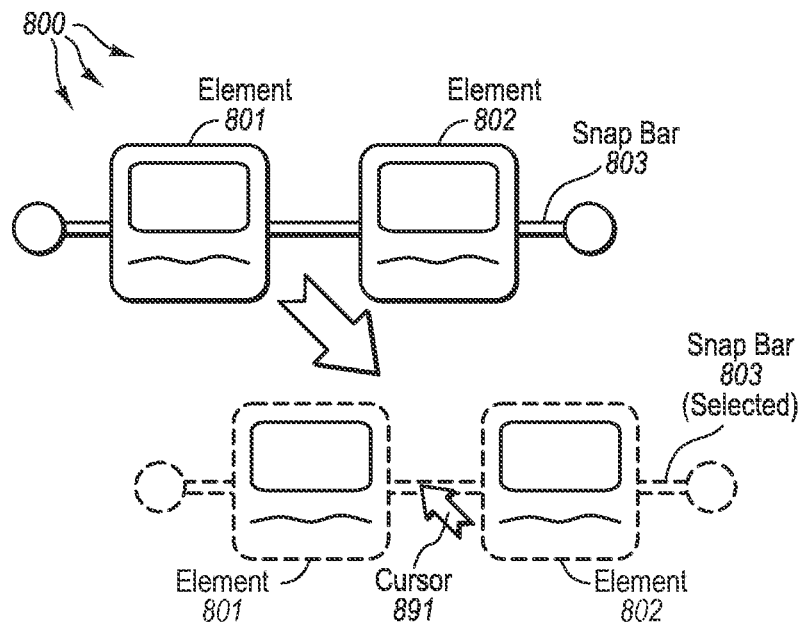
Figure 8C:
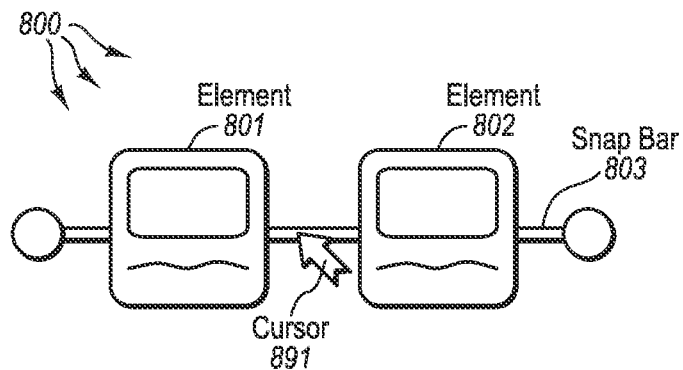

Embodiments of the invention facilitate moving a visual landmark to move all the elements positioned on the visual landmark. FIGS. 8A-8C illustrate an example of moving a snap bar to move all the elements on the snap bar in a diagram 800.

As depicted in FIG. 8A, element 801 and element 802 are positioned relative to snap bar 803 in accordance with the properties of snap bar 803. Subsequently received user-input indicates that snap bar 803 is to be selected. For example, snap bar 803 can be selected with cursor 891. Upon selection, snap bar 803 can be moved within diagram 800. For example, as depicted in FIG. 8B, snap bar 803 can be moved down and to the right to a new position (of snap bar 803 selected). Elements 801 and 802 move with snap bar 803. Further user input can indicate that snap bar 803 is to stay at the new position within diagram 800. A drag and drop operation can be used to move snap bar 803, along with elements 801 and 802, to the new position.

Figure 9B:
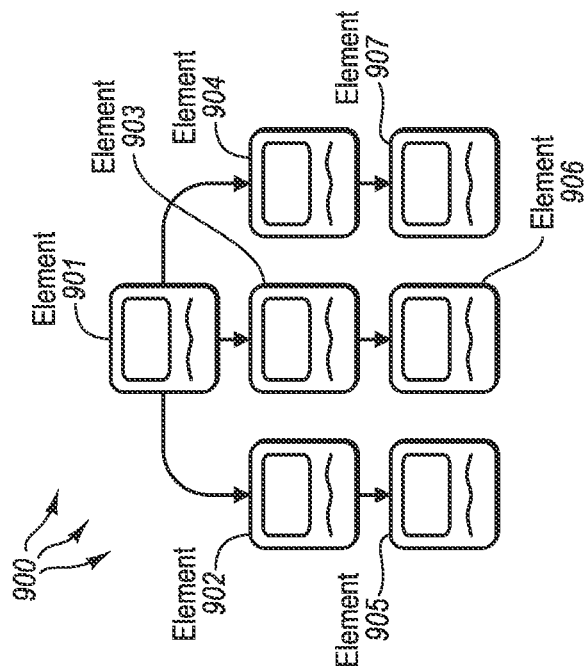
FIGS. 9A and 9B illustrate another example of using visual landmarks to organize a diagram.
Figure 9A:
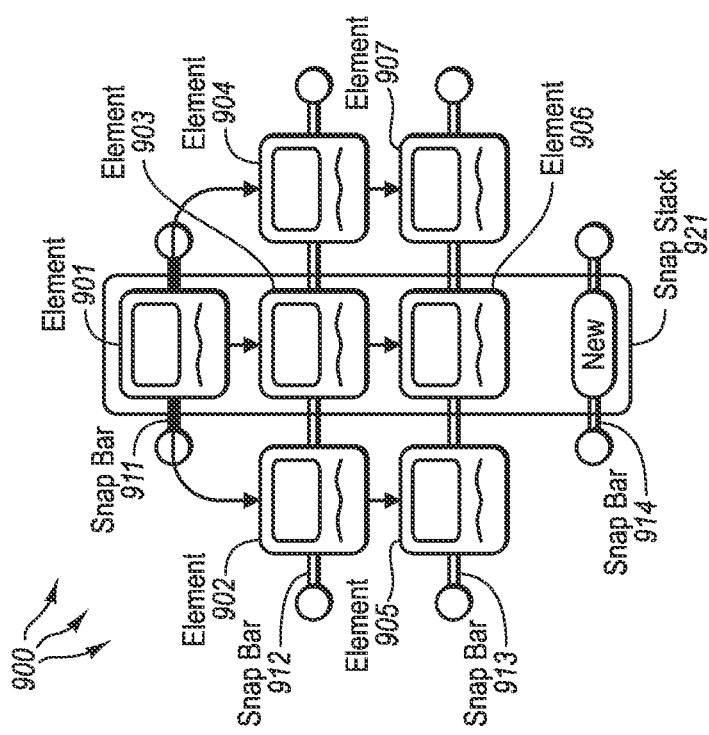

Embodiments of the invention facilitate toggling the visibility of visual landmarks. FIGS. 9A and 9B illustrate an example of toggling snap bars in a diagram 900.

As depicted in FIG. 9A, element 901 is positioned relative to snap bar 911, elements 902, 903, and 904 are positioned relative to snap bar 912, and elements 905, 906, and 907 are positioned relative to snap bar 913. Snap bar 914 is indicated as available to received visual elements. Snap stack 921 provides a grid structure to arrange elements within diagram 900. For example, snap stack 921 can have properties to maintain a defined spacing between adjacent snap bars (essentially maintaining a number of rows). Each snap bar (row) can be resized horizontally to accommodate elements as appropriate. As elements are added to diagram 900 they can occupy a new snap bar or a location on an existing snap bar.

As depicted in FIG. 9B, snap stack 921 is toggled off (including snap bar 914 since it is empty). However, the arrangement of elements in accordance with the properties of the visual landmarks of FIG. 9A remains. As such, elements can be organized using visual landmarks and the visual landmarks subsequently hidden such that just the organized arrangement of elements remains.

Thus, generally, visual landmarks can be added to diagram to assist in organizing elements within the diagram. A variety of different types of visual landmarks can be used. Each type of visual landmark can include configurable properties defining arrangements and adjustments for elements associated with the type of visual landmark. Configurable properties can define how associated elements are to be positioned relative to the visual landmark. Configurable properties can also define how associated elements are to be positioned relative to one another. Subsequently, elements within the diagram can be associated with a visual landmark and arranged and/or adjusted in accordance with the configurable properties of the visual landmark.

For example, FIGS. 10A-10D illustrate a number of examples of snap bars that can be used to organize elements in a diagram. FIG. 10A depicts elements 1001 and 1002 positioned relative to horizontal snap bar 1003. One of the properties of horizontal snap bar 1003 can indicate that elements are to be evenly spaced horizontally on horizontal snap bar 1003. FIG. 10B depicts elements 1011, 1012, and 1013 positioned relative to horizontal snap bar 1014. One of the properties of horizontal snap bar 1014 can indicate the increased spacing between element 1012 and element 1013 on horizontal snap bar 1014. FIG. 10C depicts elements 1021, 1022, and 1023 positioned relative to vertical snap bar 1024. One of the properties of vertical snap bar 1024 can indicate that elements are to be evenly spaced vertically on vertical snap bar 1024. FIG. 10D depicts elements 1031 and 1032 on diagonal snap bar 1033.

FIGS. 11A and 11B illustrate examples of snap Beziers that can be used to organize elements in a diagram. Snap Beizers are a variant of a snap bar. FIG. 11A depicts elements 1101, 1102, 1103, and 1104 on snap Bezier 1105. One of the properties of snap Bezier 1105 can be that it has a less pronounced curvature. FIG. 11B depicts elements 1111, 1112, 1113, and 1114 on snap Bezier 1115. One of the properties of snap Bezier 1105 can be that it has a more pronounced curvature.

FIGS. 12A-12C illustrate examples of snap arcs that can be used to organize elements in a diagram. Snap arcs are similar to snap bars but are elliptical in shape. FIG. 12A depicts elements 1201, 1202, 1203, 1204, and 1205 on snap arc 1206. Properties of snap arc 1206 can include a smaller radius and larger angle (i.e., closer to being a complete circle). FIG. 12B depicts elements 1211, 1212, and 1213 on snap arc 1214. Properties of snap arc 1214 can include a smaller radius and smaller angle (i.e., further from being a complete circle). FIG. 12C depicts elements 1221, 1222, and 1223 on snap arc 1224. Properties of snap arc 1224 can include a larger radius and smaller angle.

Further, snap bars, snap beziers, and snap arcs can have a variety of other configurable properties in common. For example, snap bars, snap beziers, and snap arcs can include configurable properties that define whether distribution is evenly or freeform, one or more of bottom align, top align, left align, and right align (when applicable), an angle of rotation (e.g., 45 degrees, 90 degrees etc.), and a spacing (e.g., in pixels).

Gravity wells are elliptical in shape and can be sized as desired. Added shapes within their "field of influence" can gravitate towards them, as defined by a force-based algorithm. FIGS. 13A-13C illustrate examples of gravity wells that can be used to organize elements in a diagram. FIG. 13A depicts elements 1301, 1302, 1303, within the field of influence of gravity well 1304. Gravity well 1304 is circular in shape. FIG. 13B depicts elements 1311, 1312, and 1313, within the field of influence of gravity well 1314. Gravity well 1314 is elliptical and vertically oriented. FIG. 13C depicts elements 1321 and 1322 within the field of influence of gravity well 1323. Gravity well 1323 is elliptical and diagonally oriented. Gravity wells can include configurable properties that define a range (e.g., in diameter) and a distribution (e.g., balanced, top, bottom, left, right, etc).

Figures 14A, 14B:
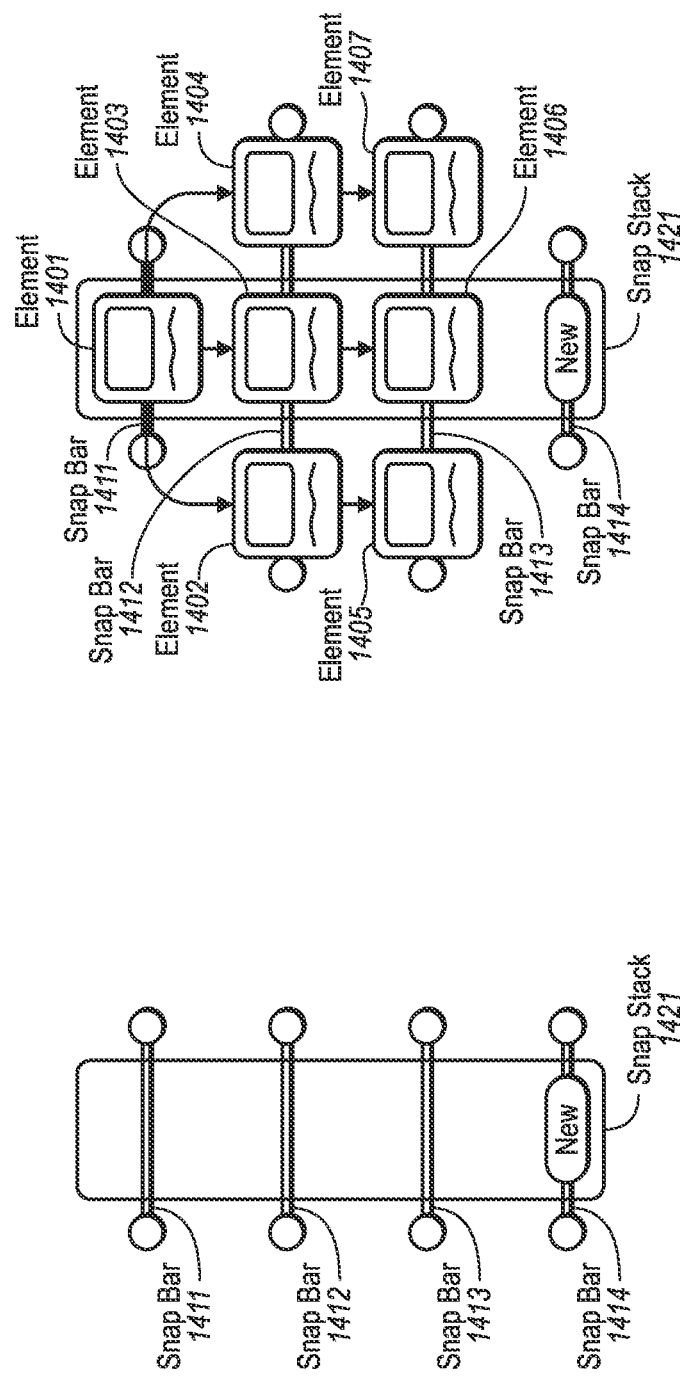
FIGS. 14A and 14B illustrates an example of a snap stack that can be used to organize elements in a diagram.

Snap stacks can be used to arrange elements according to a stacking grid structure. As shapes are added to a path they can occupy a new row or a cell within an exiting row. New rows and cells can be generated as elements are added to the snap stack. FIGS. 14A and 14B illustrates an example of a snap stack that can be used to organize elements in a diagram. FIG. 14A depicts snap stack 1421 including snap bars 1411, 1412, 1413, and 1414. FIG. 14B depicts interconnected elements 1401-1407 positioned on snap bars 1411, 1412, and 1413. Snap stacks can include configurable properties that define cell distribution (e.g., freeform or evenly) stack left, stack middle, stack right, rotation (e.g., 45 degrees, 90 degrees, etc), and row spacing.

Figure 15:
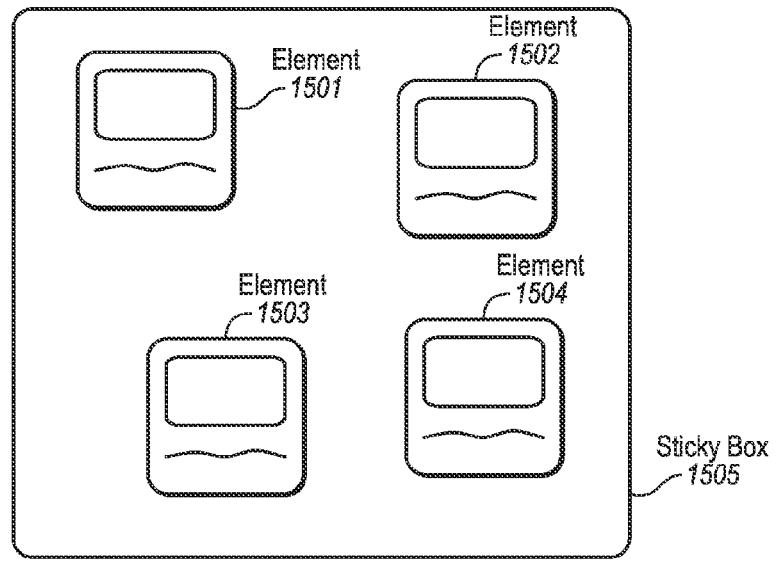
FIG. 15 illustrates an example of a sticky box that can be used to organize elements in a diagram.
Figure 16:
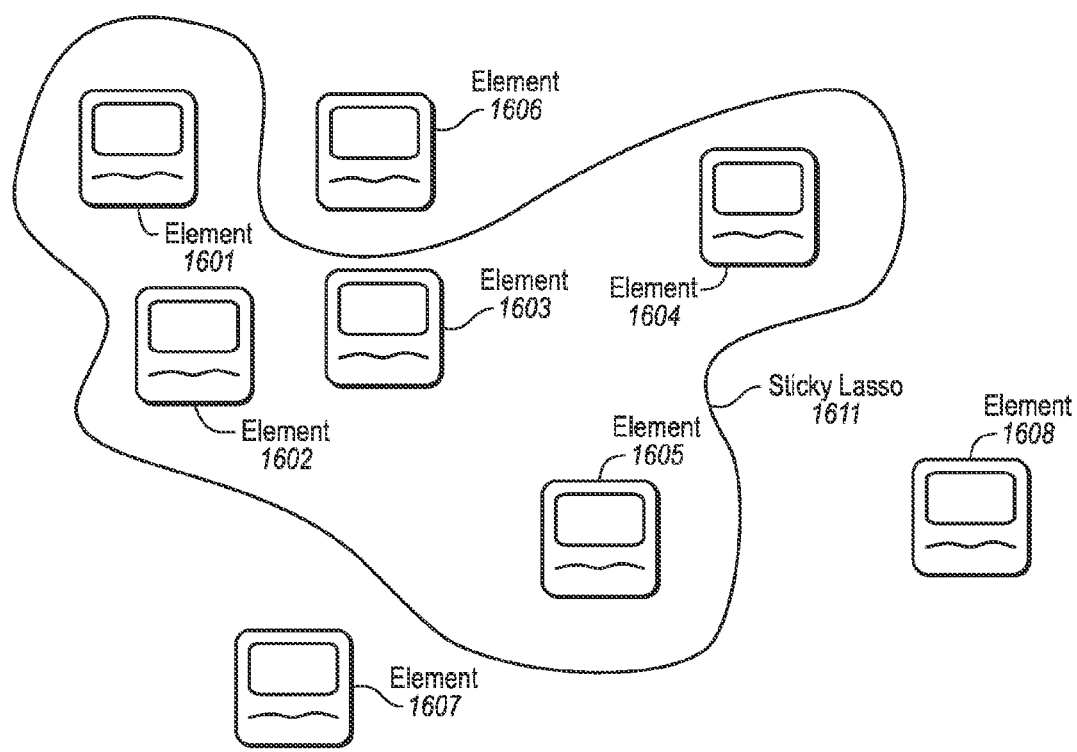
FIG. 16 illustrates an example of a sticky lasso that can be used to organize elements in a diagram.

Sticky boxes are rectangular and act as visual groups that can be used to organize, move, and manage collections of elements. FIG. 15 illustrates an example of a sticky box that can be used to organize elements in a diagram. FIG. 15 depicts elements 1501-1504 within sticky box 1505. Sticky lassos are arbitrarily shaped and act as visual groups that can be used to organize, move, and manage collections of elements. FIG. 16 illustrates an example of a sticky lasso that can be used to organize elements in a diagram. FIG. 16 depicts elements 1601-1605 within sticky lasso 1611. Elements 1606, 1607, and 1608 are outside of sticky lasso 1611. Sticky lassos facilitate that use of interesting grouping regions that are not suited for more standard geometric shapes. Sticky boxes and sticky lassos can include configurable properties that define expansion/contraction and resize/repath.

Generally, embodiments of the invention permit users to customize visual landmarks to cause the visual landmarks to exhibit desired behavior. Embodiments of the invention also include customizing individual visual landmarks to create new visual landmarks. For example, the radius of an existing snap arc can be modified (increased or decreased) to create a new snap arc, an existing sticky lasso can be modified to create a region with new boundaries, a snap Bezier can be modified to alter a curvature, add a new curve, or remove an existing curve to create a new snap Bezier, etc.

Figure 17:
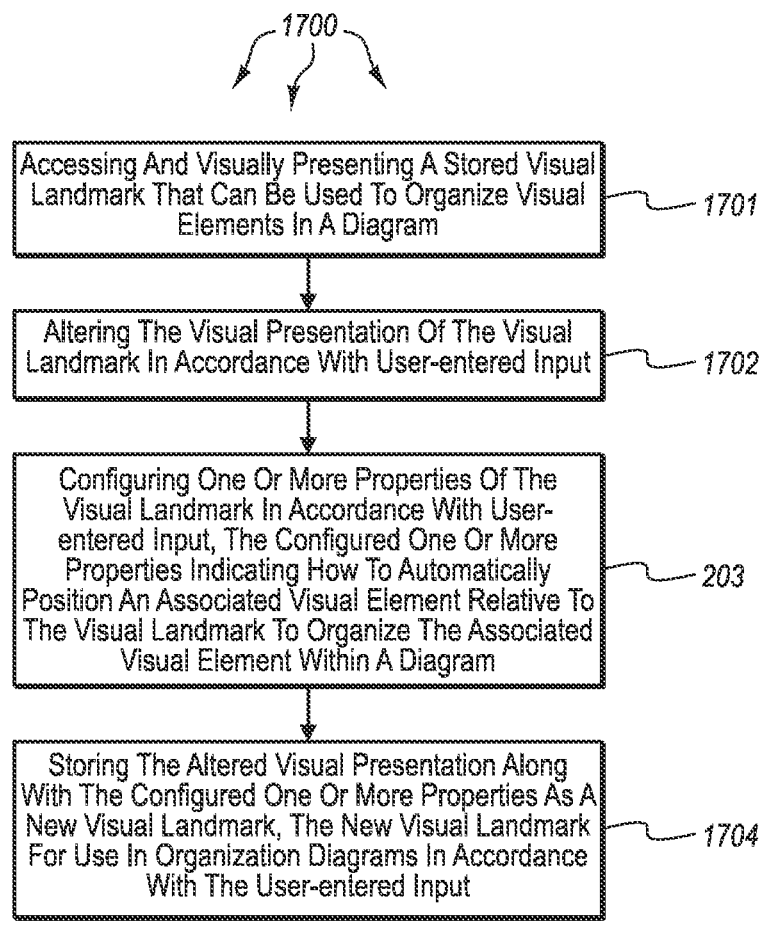
FIG. 17 illustrates a flow chart of an example method for customizing a visual landmark.
Figure 18:
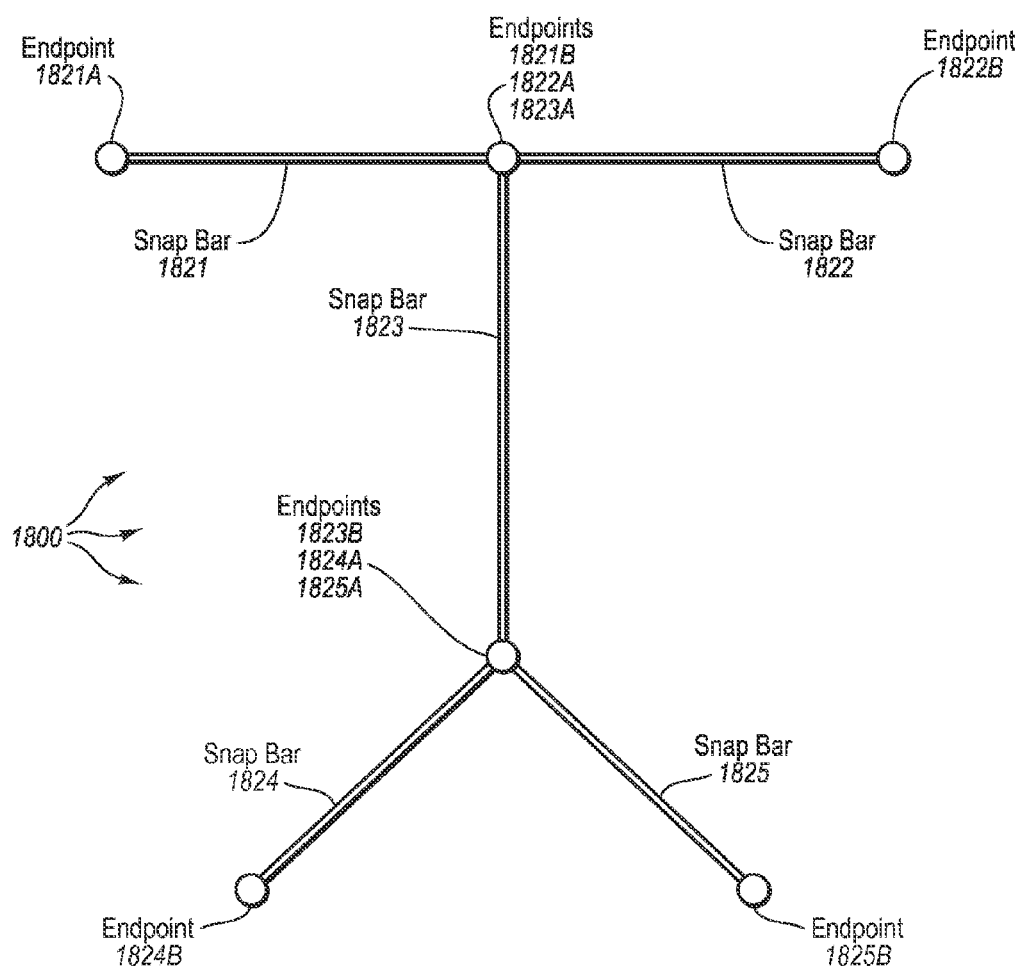
FIG. 18 illustrates an example of a customized visual landmark.

In some embodiments, a plurality of existing visual landmarks is combined to create a customized visual landmark. FIG. 18 illustrates an example of a customized visual landmark 1800. FIG. 17 illustrates a flow chart of an example method 1700 for customizing a visual landmark. The method 1700 will be described with respect to the components of computer architecture 100 of FIG. 1 and customized visual landmark 1700.

Method 1700 includes an act of accessing and visually presenting a stored visual landmark that can be used to organize visual elements in a diagram (act 1701). For example, referring now to FIG. 1, a user 113 can enter visual landmark selection input 134. User interface 101 can determine that visual landmark selection input 134 is user input selecting a visual landmark. In response, user interface 101 can forward visual landmark selection input 134 to diagram editor 102. Diagram editor 102 can process visual landmark selection input 134 and access a visual landmark from visual landmark repository 135. Diagram editor 102 can include the visual landmark in diagram data 112 and send diagram data 112 to rending model 107 for presentation at display device 108. Rendering module 107 can visually render the selected visual landmark on display 109. When a plurality of existing visual landmarks are to be combined. Act 1701 can be repeated as appropriate to access and visually present each visual landmark of the plurality of visual landmarks. For example, referring to FIG. 18, act 1701 can be repeated to access snap bars 1821, 1822, 1823, 1824, and 1825.

Method 1700 includes an act of altering the visual presentation of the visual landmark in accordance with user-entered input (act 1702). For example, user 131 can enter user input to alter any visual landmarks visually presented in act 1701. When a visual landmark is selected, visual landmark feedback can visually indicate the selection to use 113 (e.g., using any indication applicable to elements within a diagram). For example, upon selection snap bar 1821 rendering module can send visual landmark feedback 143 (e.g., presenting snap bar 1821 with a dashed line) to display device 108.

Method 1700 includes an act of configuring one or more properties of the visual landmark in accordance with user-entered input, the configured one or more properties indicating how to automatically position an associated visual element relative to the visual landmark to organize the associated visual element within a diagram (act 1703). For example, in FIG. 18, the endpoints of various snap bars can be connected to combine snap bars together. Endpoints 1821B, 1822A, and 1823A can be connected to one another and endpoints 1823B, 1824A, and 1825A can be connected to form customized visual landmark 1800.

Method 1700 includes an act of storing the altered visual presentation along with the configured one or more properties as a new visual landmark, the new visual landmark for use in organization diagrams in accordance with the user-entered input (act 1704). For example, user 113 can enter user input causing customized visual landmark 1800 to be stored in visual landmark repository 135.

Visual landmarks can be applied to diagrams having visual elements arranged in freeform manner to assist in organizing the elements within the diagrams. Visual landmarks can also be applied to diagrams having visual elements arranged in accordance with an automatic arrangement mechanism (e.g., in accordance with an auto-layout algorithm) to assist in organizing the elements within the diagrams. Visual landmarks can work in combination with an automatic arrangement mechanism by applying constraints to automatic arrangements of visual elements.

Thus, embodiments of the invention facilitate using (in some embodiments customized) visual landmarks to organize elements within a diagram. Elements of a diagram can be arranged in accordance with configurably defined properties of visual landmarks to provide some degree of layout structure within the diagram. Accordingly, embodiments of the invention provide a user experience that provides some structure but retains the flexibility of free form editing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer architecture, a method for using visual landmarks to organize a diagram, the method comprising:
   an act of displaying one or more visual elements representing a diagram;
   an act of displaying a visual landmark concurrently along with the one or more visual elements within the diagram, the visual landmark configured with one or more properties that are to be applied to associated visual elements to position the associated visual elements relative to the visual landmark;
   an act of receiving input selecting a visual element of the one or more visual elements that are displayed with the visual landmark;
   an act of receiving further input indicating that the selected visual element, which is displayed at a first location, is to be associated with the visual landmark;
   an act of automatically repositioning the selected visual element to a second location relative to the visual landmark in an updated arrangement of the one or more visual elements and the visual landmark in accordance with the one or more corresponding properties of the visual landmark and responsive to the further input; and
   an act of displaying the updated arrangement that includes a concurrent presentation of the visual landmark and the one or more visual elements, including the repositioned selected visual element.

2. The method of claim 1, wherein the method further includes modifying a size or shape of the visual landmark subsequent to displaying the updated arrangement.

3. The method of claim 2, wherein the method further includes re-adjusting a positioning of the selected visual element relative to the visual landmark, subsequent to displaying the updated arrangement, based on the one or more properties of the visual landmark and in response to the modified size or shape of the visual landmark.

4. The method of claim 3, wherein the modifying includes modifying a size.

5. The method of claim 3, wherein the re-adjusting includes moving the selected visual element.

6. The method of claim 5, wherein the modifying the size is performed in response to a positioning of a new visual element on the visual landmark.

7. The method of claim 1, wherein the further input comprises input for moving the selected visual element to intersect with the visual landmark and wherein the new visual element is positioned on the visual landmark in response to user input.

8. The method of claim 1, wherein the positioning causes the selected visual element to partially overlap with a limited portion of the visual landmark and so that only part of the selected visual element overlaps with the visual landmark.

9. The method of claim 1, wherein the method further includes an act of providing visual feedback indicating that selected visual element has been selected.

10. The method of claim 1, wherein the visual landmark comprises a snap bar.

11. The method of claim 1, wherein the visual landmark comprises a gravity well.

12. The method of claim 1, wherein the visual landmark comprises at least one of a snap arc or snap Bezier curve.

13. The method of claim 1, wherein the visual landmark comprises at least one of a snap stack or a sticky box.

14. The method of claim 1, wherein the visual landmark comprises a sticky lasso.

15. A computing system comprising:
at least one hardware processor; and
a memory having stored computer-executable instructions which, when executed by the at least one hardware processor, implement a method for using visual landmarks to organize a diagram, wherein the method includes:
- an act of displaying one or more visual elements representing a diagram;
- an act of displaying a visual landmark concurrently along with the one or more visual elements within the diagram, the visual landmark configured with one or more properties that are to be applied to associated visual elements to position the associated visual elements relative to the visual landmark;
- an act of receiving input selecting a visual element of the one or more visual elements that are displayed with the visual landmark;
- an act of receiving further input indicating that the selected visual element, which is displayed at a first location, is to be associated with the visual landmark;
- an act of automatically repositioning the selected visual element to a second location relative to the visual landmark in an updated arrangement of the one or more visual elements and the visual landmark in accordance with the one or more corresponding properties of the visual landmark and responsive to the further input; and
- an act of displaying the updated arrangement that includes a concurrent presentation of the visual landmark and the one or more visual elements, including the repositioned selected visual element.

16. The computing system of claim 15, wherein the method further includes modifying a size or shape of the visual landmark subsequent to displaying the updated arrangement.

17. The computing system of claim 16, wherein the method further includes re-adjusting a positioning of the selected visual element relative to the visual landmark, subsequent to displaying the updated arrangement, based on the one or more properties of the visual landmark and in response to the modified size or shape of the visual landmark.

18. The computing system of claim 16, wherein the modifying includes modifying a size, wherein the re-adjusting includes moving the selected visual element and wherein the modifying the size is performed in response to a positioning of a new visual element on the visual landmark.

19. The computing system of claim 15, wherein the further input comprises input for moving the selected visual element to intersect with the visual landmark and wherein the new visual element is positioned on the visual landmark in response to user input.

20. One or more hardware storage devices having stored computer-executable instructions which, when executed by at least one hardware processor of a computing system, implement a method for using visual landmarks to organize a diagram, wherein the method includes:
- an act of displaying one or more visual elements representing a diagram;
- an act of displaying a visual landmark concurrently along with the one or more visual elements within the diagram, the visual landmark configured with one or more properties that are to be applied to associated visual elements to position the associated visual elements relative to the visual landmark;
- an act of receiving input selecting a visual element of the one or more visual elements that are displayed with the visual landmark;
- an act of receiving further input indicating that the selected visual element, which is displayed at a first location, is to be associated with the visual landmark;
- an act of automatically repositioning the selected visual element to a second location relative to the visual landmark in an undated arrangement of the one or more visual elements and the visual landmark in accordance with the one or more corresponding properties of the visual landmark and responsive to the further input; and
- an act of displaying the updated arrangement that includes a concurrent presentation of the visual landmark and the one or more visual elements, including the repositioned selected visual element.

* * * * *